United States Patent [19]

Lin

[11] 4,386,961

[45] Jun. 7, 1983

[54] HETEROLOGOUS INK JET COMPOSITIONS

[75] Inventor: An-Chung R. Lin, New Town, Conn.

[73] Assignee: Exxon Research and Engineering Co., Florham Park, N.J.

[21] Appl. No.: 331,603

[22] Filed: Dec. 17, 1981

[51] Int. Cl.$^3$ .............................................. C09D 11/02
[52] U.S. Cl. ...................................... 106/22; 106/27; 260/DIG. 38
[58] Field of Search ............................ 106/22, 27, 20; 260/DIG. 38

[56] References Cited

U.S. PATENT DOCUMENTS 4,153,467 5/1979 Yano et al. ............................ 106/20
4,165,399 8/1979 Germonprez ........................ 427/264

Primary Examiner—John Kight, III
Assistant Examiner—Amelia B. Yarbrough
Attorney, Agent, or Firm—Robert S. Salzman

[57] ABSTRACT

A heterologous ink composition for use in an ink jet apparatus features two miscibly incompatible components made compatible by the use of a common solvent having misability for both aqueously and non-aqueously miscible components. The heterologous ink composition derives its print quality characteristic from the non-aqueously miscible component and its good jetability and samll dot size from its aqueously miscible component.

18 Claims, No Drawings

HETEROLOGOUS INK JET COMPOSITIONS

FIELD OF THE INVENTION

This invention pertains to ink jet compositions, and more particularly to a heterologous ink which features characteristics of both aqueously miscible and non-aqueously miscible fluids.

BACKGROUND OF THE INVENTION

Ink jet inks are formulated to provide certain characteristics such as: good penetration into paper; good print quality; small dot size; good jetability; etc.

Unfortunately, it is generally not possible to maximize more than one or two of these characteristics in any particular ink formulation.

Ink compositions usually represent a trade-off in certain characteristics in order to maximize other characteristics.

This trade-off is clearly evident when choosing between different classes of inks, i.e. between aqueously miscible and non-aqueously miscible compositions.

For example, aqueously miscible ink fluids generally provide a high surface tension characteristic for good jetability and small dot formation. Aqueously miscible ink fluids, however, have the drawbacks of: not penetrating well into paper, and having high evaporation rates.

On the other hand, non-aqueously miscible ink fluids provide round dots for good print quality, and also have low evaporation rates. They have characteristic drawbacks of higher viscosity and lower surface tension, which characteristics reduce jetability and increase dot size, respectively.

The present invention suggests a method and composition for blending generally miscible ink fluids, in order to maximize a host of ink characteristics. In this fashion, the invention suggests a way of obtaining the best features of different ink systems or classes. An additional feature of this invention allows for the use of a wider variety of dyes or coloring agents for use in the uniquely blended system, because the dye or coloring agent may be either hydrophilic or hydrophobic; i.e. compatible with either aqueously or non-aqueously miscible components.

BRIEF SUMMARY OF THE INVENTION

The invention relates to an ink jet composition and method of making same. The method comprises mixing immiscible fluids, such as aqueously miscible and non-aqueously miscible fluids in a common solvent which is commonly miscible to each of the immiscible fluids.

A dye or coloring agent can be added to this formulation which is compatible with either fluid component, i.e. a dye or coloring agent which is hydrophilic or hydrophobic.

The composition can contain one or more of each or non-aqueously miscible fluid component, but by definition must contain at least one of each fluid class. The aqueously miscible component lends to the composition an improved surface tension for the purposes of providing good jetability and small dot size. The non-aqueously miscible component lends a good print quality characteristic to the ink composition. Generally speaking, it is almost never achievable to combine or obtain these two characteristics within an ink jet blend.

One specific type of ink jet ink composition of the invention features a mixture of diethylene glycol (aqueously miscible component) and oleic acid (non-aqueously miscible component) in a common solvent comprising methoxy-triglycol.

Other compositions may include other glycol ethers having alkene-groups such as propylene and ethylene. The diethylene glycol may be a $(poly)_n$ ethylene glycol where n has a value from 1 to 5.

The oleic acid may be present in an approximate weight percentage age range of from 1 to 10.

The diethylene glycol may be present in an approximate weight percentage range of from 30 to 45.

The methoxy-triglycol may be present in an approximate weight percentage range of from 37 to 45.

It is an object of the present invention to provide a method and compositions for blending miscibly incompatible ink jet ink fluid components;

It is another object of this invention to provide an improved ink jet ink composition and method of blending ink fluids, which maximize several ink jet ink characteristics.

These and other objects of the invention will become more apparent and will be better understood with reference to the following detailed description.

DETAILED DESCRIPTION OF THE INVENTION

The invention features a method and compositions of blended ink components which are generally immiscible, and hence cannot normally be mixed or blended.

The ink components of this invention are homologized by choosing a solvent which has both a polar and a non-polar fraction or moiety, so that the molecule can be chemically compatible with either an aqueously miscible or non-aqueously miscible solute. Generally speaking, the solvent must provide these competing polar and non-polar fractions on opposite ends of the molecule, or at least sufficiently separated to avoid steric hinderances.

For a mixture of solutes of oleic acid, and diethylene glycol, a methoxytriglycol solvent meets the above criterion. This solvent molecule has both polar and non-polar fractions which are sufficiently separated to allow incompatible solutes to find a chemically favorable environment. The hydroxy—and methoxy—fractions are sufficiently separated upon the solvent molecule to allow chemical affinities with both solutes.

Another similar chemical ink system contains solutes of propylene glycol and oleic acid in a solvent of benzyl alcohol.

Table I below contains various ink compositions which combine good jetability with good print quality using the above ink system.

TABLE I

| | | | | |
|---|---|---|---|---|
| Propylene | Glycol | 50 | 25 | 70 |
| Benzyl | Alcohol | 25 | 50 | 8 |
| Oleic | Acid | 5 | 5 | 2 |
| Pontamine | Black | 20 | 20 | 20 |
| Surface Tension | 76° F. | 36.0 | 37.3 | 34.5 |
| | 135° F. | 34.7 | 35.3 | 33.5 |
| Viscosity | 76° F. | 22.5 | 13.0 | 31.4 |
| Resistivity ohms/cm | 135° F. | 8.3 | 6.0 | 10.0 |
| conductivity (micro mhos/cm) | | 380 | 400 | 318 |
| Specific gravity $(g/cm^3)$ | | 1.0315 | — | — |

In the system utilizing oleic acid and diethylene glycol in a methoxy-triglycol solvent, good jetability and good print quality is obtained by the compositions listed in Table II below:

TABLE II

|  | 1 | 2 | 3 | 4 | 5 | 6 | 7 | 8 | 9 | 10 | 11 | 12 |
|---|---|---|---|---|---|---|---|---|---|---|---|---|
| Oleic Acid | 10 | 5 | 1 | 5 | 10 | 5 | 1 | 10 |  |  | 10 | 10 |
| Diethylene Glycol | 37.5 | 40 | 42 | 45 | 37.5 | 40 | 42 | 38 | 39.5 | 39.5 | 30 | 37 |
| Methoxytriglycol | 37.5 | 40 | 42 | 35 | 37.5 | 40 | 42 | 38 | 39.5 | 39.5 | 45 | 37 |
| Aldo MLD |  |  |  |  |  |  |  |  | 7 |  |  |  |
| Pegosperse |  |  |  |  |  |  |  |  |  | 7 |  |  |
| Orasel Black RU | 10 | 10 | 10 | 10 | 10 | 10 | 10 | 11 | 11 | 11 | 7.5 |  |
| Orasel Black CN |  |  |  |  |  |  |  |  |  |  | 7.5 |  |
| Acetosel Brown 4RΔSN | 5 | 5 | 5 | 5 |  |  |  |  |  |  |  |  |
| Acetosel Brown GΔS |  |  |  |  | 5 | 5 |  |  |  |  |  |  |
| Luxol Fast Brown K |  |  |  |  |  |  | 5 | 3 | 3 | 3 |  |  |
| Pylam 82/811 |  |  |  |  |  |  |  |  |  |  |  | 16 |
| Surface Tension 76° F. | 34.6 | 34.8 | 35.0 | 34.0 | 34.0 | 34.2 | 35.0 | 33.0 | 31.8 | 33.3 | — | — |
| 135° F. | 32.2 | 34.0 | 34.5 | 33.1 | 32.0 | 33.5 | 33.5 | 31.5 | 30.9 | 32.3 | 31.5 | 32.5 |
| Viscosity 76° F. | 40.7 | 47.6 | 34.7 | 36.1 | 55.5 | 47.1 | 43.9 | 43.4 | 24.9 | 25.1 | — | — |
| 135° F. | 11.9 | 11.5 | 10.0 | 10.4 | 12.1 | 12.0 | 12.6 | 12.6 | 13.2 | 13.6 | 11.2 | 13.6 |

Having thus described the invention, what is desired to be protected by Letters Patent is presented in the following claims.

What is claimed is:

1. A non-aqueous ink composition for use in an ink jet apparatus, comprising at least one non-aqueously miscible fluid component and at least one aqueously miscible fluid component, said non-aqueously miscible component and said aqueously miscible component being normally immiscible with each other, said composition further comprising a common solvent in which said immiscible fluid components are commonly miscible, said non-aqueously miscible component lending a print quality characteristic to said ink composition, and said aqueously miscible component lending an improved surface tension characteristic to said ink composition.

2. The ink composition of claim 1, further comprising at least one hydrophilic coloring agent or dye.

3. The ink composition of claim 1, further comprising at least one hydrophobic coloring agent or dye.

4. The ink composition of claim 1, wherein said non-aqueous component comprises oleic acid.

5. The ink composition of claim 1, wherein said aqueous component comprises (poly)$_n$ ethylene glycol, wherein n has a value of from 1 to 5.

6. The ink composition of claim 1, wherein said solvent comprises a glycol ether.

7. The ink composition of claim 6, wherein said glycol ether comprises a methoxy-triglycol.

8. A ink for use in an ink jet apparatus, consisting essentially of a mixture of diethylene glycol and oleic acid in a common solvent of methoxytriglycol.

9. The ink composition of claim 8, wherein said oleic acid is present in an approximate weight percentage range from 1 to 10.

10. The ink composition of claim 8, wherein said diethylene glycol is present in an approximate weight percentage range from 30 to 45.

11. The ink composition of claim 8, wherein said methoxy-triglycol is present in an approximate weight percentage range from 37 to 45.

12. The ink composition of claim 8, further comprising at least one hydrophilic coloring agent or dye.

13. The ink composition of claim 8, further comprising at least one hydrophobic coloring agent or dye.

14. A non-aqueous ink composition for use in an ink jet apparatus, comprising at least one first fluid component and at least one second fluid component, said first fluid component and said second fluid component being normally immiscible with each other, said composition further comprising a common solvent in which said immiscible fluid components are commonly miscible.

15. A method of blending immiscible ink fluids for use in an ink jet apparatus, comprising the step of mixing aqueously miscible and non-aqueously miscible fluids that are immiscible with respect to each other, in a common solvent which is commonly miscible to each of said immiscible fluids.

16. The method of claim 15, further comprising the step of introducing a dye which is miscibly compatible with either one of said aqueously or non-aqueously miscible fluids.

17. A method of blending immiscible ink fluids for use in an ink jet apparatus, comprising the step of mixing said immiscible fluids in a common solvent which is commonly miscible to each of said immiscible fluids.

18. The method of claim 17, further comprising the step of introducing a dye which is miscibly compatible with either one of said immiscible fluids.

* * * * *